United States Patent
Herbst

(10) Patent No.: US 7,381,380 B2
(45) Date of Patent: Jun. 3, 2008

(54) PLASMA BASED TRACE METAL REMOVAL APPARATUS

(75) Inventor: Christopher A. Herbst, Westminster, CO (US)

(73) Assignee: Continental Research & Engineering, Englewood, CO (US)

( * ) Notice: Subject to any disclaimer, the term of this patent is extended or adjusted under 35 U.S.C. 154(b) by 335 days.

(21) Appl. No.: 11/186,591

(22) Filed: Jul. 21, 2005

(65) Prior Publication Data

US 2006/0067862 A1    Mar. 30, 2006

Related U.S. Application Data

(63) Continuation of application No. 10/133,688, filed on Apr. 26, 2002, now Pat. No. 6,969,494.

(60) Provisional application No. 60/290,521, filed on May 11, 2001.

(51) Int. Cl.
*B01J 19/08* (2006.01)
*A62D 3/00* (2007.01)

(52) U.S. Cl. .................. 422/186.03; 422/186.04; 422/186.07; 204/164; 588/311

(58) Field of Classification Search ........... 422/186.03, 422/186.04, 186.07; 204/164; 588/227, 588/311

See application file for complete search history.

(56) References Cited

U.S. PATENT DOCUMENTS

| | | | |
|---|---|---|---|
| 5,409,522 A | 4/1995 | Durham et al. | |
| 5,414,324 A | 5/1995 | Roth et al. | |
| 5,746,984 A * | 5/1998 | Hoard | 422/169 |
| 5,785,932 A | 7/1998 | Helfritch | |
| 5,807,466 A | 9/1998 | Wang et al. | |
| 5,871,703 A | 2/1999 | Alix et al. | |
| 5,888,926 A | 3/1999 | Biswas et al. | |
| 5,900,042 A | 5/1999 | Mendelsohn et al. | |
| 5,961,772 A | 10/1999 | Selwyn | |
| 5,977,715 A | 11/1999 | Li et al. | |
| 6,030,506 A | 2/2000 | Bittenson et al. | |
| 6,117,403 A | 9/2000 | Alix et al. | |
| 6,132,692 A * | 10/2000 | Alix et al. | 423/210 |
| 6,146,599 A | 11/2000 | Ruan et al. | |
| 6,193,934 B1 * | 2/2001 | Yang | 422/174 |
| 6,395,144 B1 * | 5/2002 | Yi et al. | 204/164 |
| 6,432,280 B1 * | 8/2002 | Bianco et al. | 204/164 |
| 6,475,350 B2 | 11/2002 | Palekar et al. | |
| 6,969,494 B2 * | 11/2005 | Herbst | 422/186.03 |

(Continued)

OTHER PUBLICATIONS

United States Environmental Protection Agency, Mercury Study Report to Congress,Executive Summary, vol. 1, Dec. 1997, EPA-452/R-97-003.

(Continued)

*Primary Examiner*—N. Bhat
(74) *Attorney, Agent, or Firm*—Fraser Clemens Martin & Miller LLC; J. Douglas Miller

(57) ABSTRACT

A system and method for the removal of metals such as mercury from a gas stream. The method involves contacting a gas stream containing the target metals with reactive chemical species generated in a plasma device. The metal to be removed is chemically converted into forms enabling capture in either conventional particulate removal devices or in a wet scrubber for the capture of a soluble chemical species.

8 Claims, 6 Drawing Sheets

U.S. PATENT DOCUMENTS

| | | |
|---|---|---|
| 2002/0166761 A1 | 11/2002 | Herbst |
| 2003/0051993 A1 | 3/2003 | Ricatto et al. |
| 2003/0066285 A1 | 4/2003 | Raybone et al. |
| 2003/0150709 A1 | 8/2003 | LaBarge et al. |
| 2004/0140194 A1 | 7/2004 | Taylor, Jr. et al. |

OTHER PUBLICATIONS

J.S. Francisco, Ab Initio Characterization of HOClO3 and HO4Cl: Implications for Atmospheric Chemistry, Journal of Physical Chemistry, Jun. 29, 1995, pp. 13422-13425, published by Purdue University, West Lafayette, Indiana, USA.

J.W. Hoard et al., Cluster formation by barrier discharge in simulated engine exhaust gas at high temperature, Applied Physics Letters vol. 76, No. 21, pp. 3000-3001, Ford Research Laboratory, Dearborn, MI USA published Mar. 27, 2000.

B.M Penetrante et al., Environmental applications of low-temperature Plasmas, Pure Appl. Chem., vol. 71, No. 10, pp. 1829-1835, 1999, Lawrence Livermore National Laboratory, Livermore, CA USA, printed in Great Britain.

Kevin C. Galbreath et al., Mercury Speciation in Coal Combustion and Gasification Flue Gases, Journel, Mar. 25, 1996, pp. 1-13 Energy & Environmental Research Center, North Dakota USA.

Che-Jen Lin et al,. Oxidation of elemental mercury by aqueous chlorine (HOCl/OCl): Implications for tropospheric mercury chemistry, Journal of Geophysical Research, vol. 102 No. D21, pp. 28,093-28,102, Nov. 20, 1998, Dept. of Civil and Environmental Engineering Cinncinati OH USA.

Z.K. Nikitina et al. Anhydrous Mercury (1) and Mercury (11) Perchlorates, Russian journal of Inorganic Chemistry 31 pp. 1682-1685, Jan. 25, 1986, Kurnakov Institute of General and Inorganic Chemistry, Russia.

A.J. Colussi et al., Temperature Dependence and mechanism of the Reaction between O (3P) and Chlorine Dioxide, J. Phys. Chem. pp. 4442-4445, Jan. 9, 1992, Jet Propulsion Laboratory, California Institute of Technology, CA USA.

M. Fourati et al., Reactivite du trioxyde de chlore avec des chlorures, des nitrates, des carbonates et des perchlorates hydrates. Synthese et analyse structurale de complexes de Cd (II) et Hg (II): Cd (ClO4)2, Hg (ClO4)2, ClO2Cd(ClO4)3, NO2Cd(ClO4)3, (NO2)2Hg(ClO4)4 et HgClClO4, Canadian Journal of Chemistry 65 pp. 2783-2790, 1987 published in France.

Susan Budavari, The Merck Index, Encyclopedia of Chemicals, Drugs, and Biologicals, 12 the Edition, pp. 1003-1004, published by Merck Research Lavoratories Division of Merck & Co, Inc. 1996, NJ, USA.

J.L. Pascal et al., Inorganic perchlorato complexes, Coordination Chemistry Reviews 178-180, 1998. pp. 865-902, France.

N.M.N. Gowda et al., Perchlorate Ion Complexes, Advances In Inorganic Chemistry and Radiochemistry vol. 28 pp. 255-298, 1984, Dept. of Chemistry, Central College, Bangalore, India.

J.S. Francisco et al. Structures, Relative Stabilities, and Vibrational Spectra of Isomers of HClO3, Journal of Physical Chemistry 100, pp. 573-579, 1996 California Institute of Technology, CA USA.

C.J. Lin et al., The Chemistry of atmospheric mercury: a review, Atmospheric Environment 33, pp. 2067-2079 1999, Department of Civil and Environmental Engineering, University of Cincinnati, Cincinnati, OH USA.

E.J. Granite et al., Novel Sorbents for mercury Removal from Flue Gas, Ind. Eng. Chem. Res 2000, 39, pp. 1020-1029, National Energy Technology Laboratory, United States Department of Energy, Pittsburg, PA USA.

C.J. Fitzsimmons, et al. The Chemistry of Dichloromethane Destruction in Atmospheric-Pressure Gas Streams by a Dielectric Packed-Bed Plasma Reactor, J. Phys. Chem. A 2000, 104 pp. 6032-6038, Department of Chemistry, University of Manchester, U.K.

J.W. Hoard et al. Electro-Catalytic Oxidation Technology applied to Mercury and Trace Elements Removal from Flue Gas, Conference on Air Quality II, McLean, VA, USA Sep. 20, 2000.

\* cited by examiner

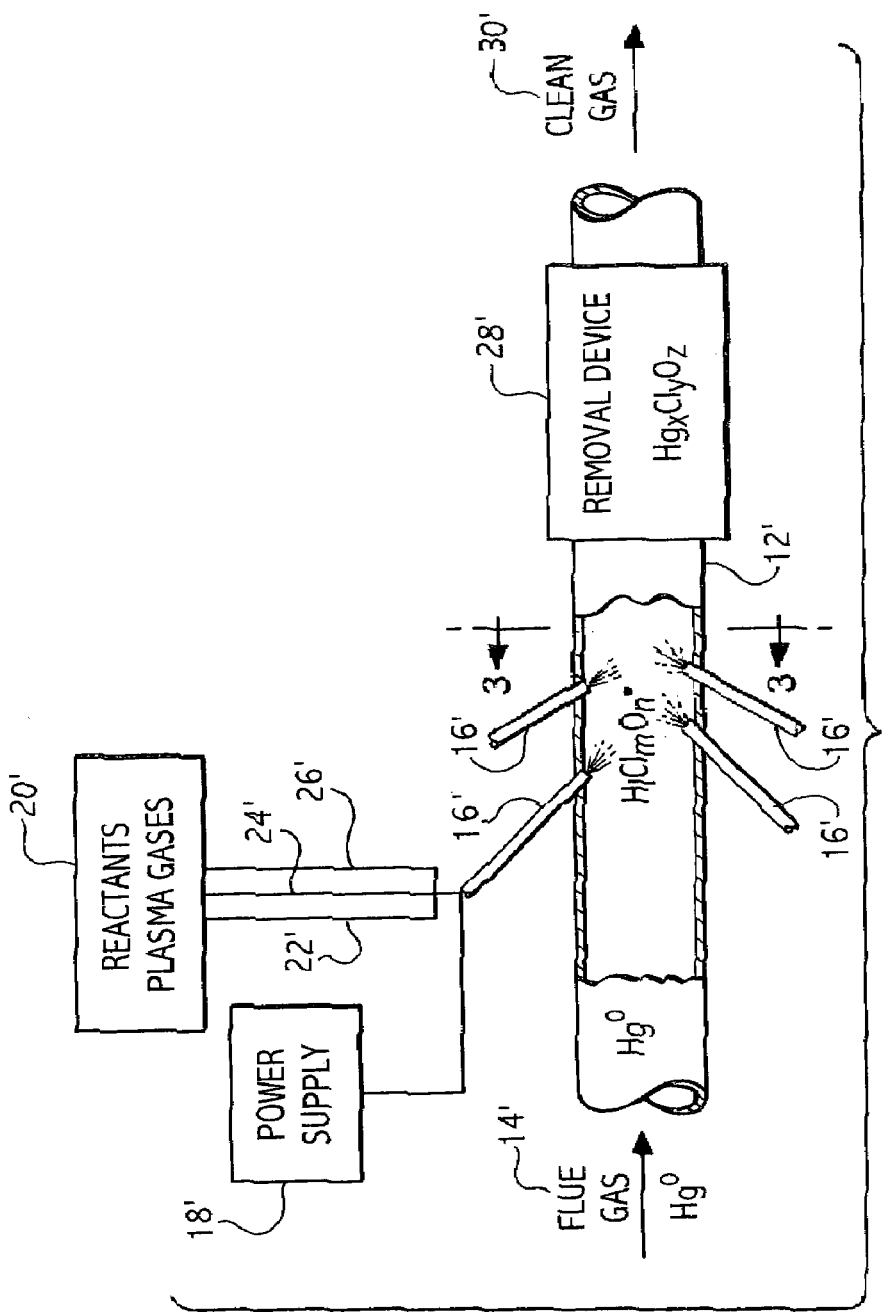
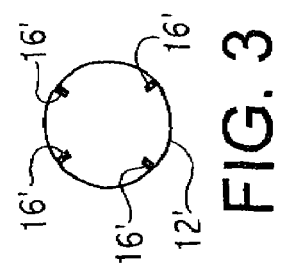
FIG. 2
FIG. 3

PLASMA BASED TRACE METAL REMOVAL APPARATUS

CROSS-REFERENCE TO RELATED APPLICATION

This application is a continuation patent application of U.S. patent application Ser. No. 10/133,688 which claims the benefit of U.S. provisional patent application Ser. No. 60/290,521, filed May 11, 2001.

FIELD OF THE INVENTION

The invention relates to an apparatus and method for the removal of mercury, other trace metals, and other chemical species from a gas stream and more particularly to a system and method for the treatment of flue gas streams from incinerators, boilers, other combustors, utilities, refineries, smelters, manufacturing and other facilities.

BACKGROUND OF THE INVENTION

There have been a number of attempts to regulate metals emissions. Under Title III of the Clean Air Act Amendments of 1990, the Maximum Achievable Control Technology (MACT) standards were established. The standards identify eleven metals in the list of hazardous air pollutants (Federal Register, volume 64, No. 189, page 52845 (Sep. 30, 1999). Six of these metals are sorted into volatility groups: high volatile (mercury), semi-volatile (lead, cadmium) and low volatile (arsenic, beryllium and chromium). The remaining five metals are controlled as "particulate matter". MACT standards have been developed both for existing and new point sources. A point source is any discernible, confined and discrete conveyance from which pollutants are or may be discharged. In principle, MACT provides a technology-driven set of federal regulations. In practice, many industries have been unable to meet the proposed limits by using currently available pollution control technologies.

Mercury from anthropogenic sources presents a difficult environmental problem. In comparison to other toxic metals, mercury has a very low vaporization temperature. Mercury and mercury compounds are highly toxic, and organic forms such as methyl mercury can be bio-accumulated. Exposure pathways include inhalation and transport to surface waters. Mercury poisoning can result in both acute and chronic effects. Most commonly, chronic exposure to mercury vapor affects the central nervous system and the brain, resulting in neurological damage.

Mercury speciation is an important factor in appropriate removal strategies. Mercury can exist in the elemental form ($Hg^0$) and in ionic forms ($Hg^{+2}$, $Hg_2^{+2}$). Speciation is highly dependent upon the chemical environment. Mercury speciation in the atmosphere is typically quite different than speciation from anthropogenic sources. In flue gas, mercury primarily exists in the ionic form, mainly as $HgCl_2$ and also as HgO. On average, the speciation of mercury in flue gases is 79% ionic, with the balance elemental mercury. Understanding and controlling the chemistry is critical to proper pollution control. For example, electrostatic precipitators can be very effective in removing ionic mercury, but inefficient in removing elemental mercury.

The flue gas composition can strongly influence the success of a mercury capture technology. Typical flue gas components can include $O_2$, HCl, $Cl_2$, $SO_2$, $NO_2$, $N_2O$, NO, $NH_3$ and $H_2S$. The presence and concentrations of these species can greatly enhance or complicate the mercury capture process. For example, HCl can result in the formation of $HgCl_2$ that can be scrubbed or absorbed. Alternatively, other species can act as reducing agents, with the undesirable outcome of converting ionic or oxidized mercury to elemental mercury.

There are a number of mercury removal technologies available. Such technologies include adsorption, amalgamation, wet scrubbing and electrostatic precipitation. However, the Environmental Protection Agency has concluded that no single technology has proven efficient for mercury capture (EPA-452/R-97-003).

Carbon filters function via adsorption and are used to remove organics, heavy metals and acid gases. Oxidized mercury is captured by activated carbon while elemental mercury is not. Activated carbon injection into hot flue gas has also been explored. This is limited to low temperature operations for effective removal (<90-120° C.; 200-250° F.). Packed beds of sulfur, iodine or chlorine impregnated carbon have also been utilized.

Numerous other sorbents have also been tested. These are discussed in detail by Granite et al. (2000). A method for in situ generation of sorbents has also been disclosed in U.S. Pat. No. 5,888,926. In general, mercury capture by sorbents is mass transfer limited. This is due to the very low mercury concentration in high volumes of flue gas. This results in competition with other species for active sites on the sorbent. Uncertainties also exist regarding the sufficiency of residence time in various applications. Spent carbon must also be disposed of, has a finite adsorption capacity, and can potentially lead to bed fires resulting from hot spot formation. Disposal options include combustion, landfilling, or treatment as a hazardous waste.

Wet scrubbing is used as a gas treatment scheme to remove acid gases, metals, particulate matter, dioxins and furans. However, this is a very limited method for mercury capture due to the near insolubility of mercury and mercury oxide.

Selenium filters have been tested on flue gas streams with low Hg concentrations. However, filter lifetime is limited, the selenium filter is not regenerable, and the HgSe formed must be landfilled. Other regenerable noble metal sorbents, such as gold monoliths have been developed (see U.S. Pat. No. 5,409,522).

A method for removing elemental mercury from a gas stream by an oxidation reaction to form a water-soluble mercury compound has been disclosed in U.S. Pat. No. 5,900,042. Aqueous iodine, bromine, chlorine and chloric acid are described for reaction with mercury to form soluble halogenated mercury compounds. The '042 patent discloses the injection of a reactive solution into the gas duct using a nozzle or an atomizer to generate a mist. Alternatively, the gas stream may be contacted with the reactants in a liquid scrubber. Reported test results varying bubble size indicated that gas phase reactions are particularly important for complex flue gas mixtures. The test results also indicate that the reactions may be kinetically or mass transfer limited, as mercury removal is less than optimal.

The chemistry of metal perchlorates has been reviewed by Gowda et al. (1984) and Pascal and Favier (1998). Gowda et al. state that a "considerable" number of mercury perchlorate complexes are known, including a number of complexes containing organic molecules. Pascal and Favier discuss synthetic methods, including the use of $HClO_4$ and $Cl_2O_6$ as starting materials. Fourati et al. (1987) used chlorine trioxide ($Cl_2O_6$) to synthesize a highly ionic compound $HgCl(ClO_4)$. Other compounds identified and synthesized include a mercury (I) perchlorate, $Hg_2(ClO_4)_2$, a mercury (II) perchlorate, $Hg(ClO_4)_2$, a mercury (II) oxide perchlorate, $Hg_2(ClO_4)_2 \cdot 2HgO$ (Nikitina and Rosolovskii, 1986) and hydrated mercury perchlorates.

Oxygen-chlorine reactions are particularly important in atmospheric chemistry. The experimental and theoretical literature in this area is substantial and useful in predicting and understanding the pertinent gas and liquid phase chemistry. The atmospheric chemistry of mercury and reactions with $HOCl/OCl^-$ have been detailed (Lin and Pehkonen, 1998, 1999). Ab initio methods have been utilized to investigate the gas phase properties of potentially important reactants such as O+OClO (Colussi et al. 1992) and $HClO_3$ (Francisco and Sander, 1996). The equilibrium structures $HOClO_3$ and $HO_4Cl$ have also been examined (Francisco, 1995). This work determined that in addition to perchloric acid ($HOClO_3$), a linear chain HOOOOCl isomer (bonded dimer of $HO_2$ and $ClO_2$) is a stable structure.

Non-thermal atmospheric pressure plasma systems have been demonstrated for emissions reductions by a number of different researchers. Such work has primarily targeted $NO_x$ control (Penetrante et al. 1999). These plasmas produce highly reactive ions and metastable species to achieve chemical and thermal conversions, with gas temperatures on the order of 100° C. Similar devices have also been demonstrated for destruction of low concentrations of volatile organic compounds such as dichloromethane, methyl chloride, carbon tetrachloride, trichloroethane, trichloroethene and chlorobenzene (Fitzsimmons et al. 2000). A limited amount of research has also discussed volatile metals capture. Non-thermal plasma-based devices for mercury removal have exclusively utilized an oxygen based, barrier discharge type plasma. The chemistry employed in these devices is the reaction of activated oxygen with elemental mercury to form mercury (II) oxide. This oxide particle is captured downstream using conventional means.

U.S. Pat. No. 6,117,403 discloses an atmospheric pressure corona discharge oxygen device that can be used for mercury removal. Testing on flue gases with this system is further described in McLarnon et al. (2000). The device includes initial particulate removal in a dry electrostatic precipitator, conversion of elemental mercury to HgO via an oxygen plasma and subsequent collection on a wet electrostatic precipitator. The reported mercury removal efficiencies range from 68-82%. The upstream filtering device is primarily used to prevent electrode fouling. However, this precludes the participation of the initial particulates in a downstream agglomeration and growth scheme.

U.S. Pat. No. 5,785,932 reports a process employing the combination of a perforated corona discharge plate and catalyst. In the absence of the corona discharge, the catalyst functions to adsorb elemental mercury from the gas stream. When the corona discharge device is energized, the molecules desorb and are oxidized. These mercuric oxide particles are captured using conventional particulate control technologies. The reactor relies upon the development and highly efficient function of a catalyst containing vanadium and titanium for the adsorption of elemental mercury. Details of the catalyst adsorption characteristics including mercury competition with other off-gas components are not provided.

The presence of larger particulates may prove beneficial to promote particle clustering or agglomeration. For example, such primary large particles may serve as growth sites for mercury compounds. A similar concept has been reported after plasma treatment of simulated engine exhaust gases (Hoard et al. 2000).

A number of atmospheric pressure plasma devices are disclosed. U.S. Pat. No. 5,414,324 describes the design of a One Atmosphere Uniform Glow Discharge Plasma device. U.S. Pat. No. 5,961,772 discloses the design for a non-thermal atmospheric pressure plasma jet. This device reports the use of activated species generated using plasma gas mixtures of $CF_4/O_2/He$, $O_2/He$ and $O_2/H_2O/He$. U.S. Pat. No. 5,977,715 describes a handheld glow discharge atmospheric pressure plasma device producing plasma comprised of mixtures of Ar, He and $O_2$. U.S. Pat. No. 6,030,506 describes the generation of non-thermal plasma species introduced into a fluid medium by high-speed injection. The activated species described include monatomic nitrogen and oxygen, OH., $H_2O$., SH., $CH_3$., and other hydrocarbon species.

It must be noted that the prior art referred to hereinabove has been collected and examined only in light of the present invention as a guide. It is not to be inferred that such diverse art would otherwise have been assembled absent the motivation provided by the present invention, nor that the cited prior art when considered in combination suggests the present invention absent the teachings herein.

It would be desirable to produce a plasma based trace metal removal apparatus and method for the capture and removal from gas streams of mercury and other volatile and semi-volatile metals and trace species.

SUMMARY OF THE INVENTION

Consistent and consonant with the present invention, a plasma based trace metal removal apparatus and method for the capture and removal from gas streams of mercury and other volatile and semi-volatile metals and trace species has surprisingly been discovered.

The plasma based trace metal removal system comprises at least one non-thermal plasma generation device adapted to be installed in a conduit, a source of electrical power supplying electrical power to the plasma device, a source of plasma gas in fluid communication with the plasma device to create an activated species within the plasma device and discharge the activated species into a gas stream containing at least one contaminant, whereby the activated species reacts with the at least one contaminant to form at least one reactant compound, and a removal device for removing the at least one reactant compound from the gas stream.

The embodiments to be described provide a means for mercury removal from the gas phase. These embodiments couple the known chemistry of mercury-chlorine-oxygen reactions with the generation of highly reactive species in a non-thermal atmospheric pressure plasma device. The generation of highly reactive metastable species in a non-thermal plasma device provides a means to contact activated species with mercury in a kinetically and thermodynamically favorable concept.

The embodiments describe a system incorporating a non-thermal plasma generation device. The plasma gases are generated by combination of reactive gases that include those of the general formula $H_iCl_jO_k$. The plasma device therefore generates metastable species of the general form $H_lCl_mO_n$. The metastable species are contacted with a flue gas stream containing elemental mercury. The targeted reaction is therefore to convert elemental mercury to a mercury oxy-chloride of the general form $Hg_xCl_yO_z$. The $Hg_xCl_yO_z$ is an ionic mercury compound that can be captured as a particle using a conventional method. Conversely, $Hg_xCl_yO_z$ can also be formulated as a highly water soluble species. In this method, the soluble $Hg_xCl_yO_z$ can be captured in a wet scrubbing device. The gas phase chemistry and final removal method can be varied depending upon specific facility requirements such as existing system specifications, permitting, environmental requirements and other assessments, for example.

BRIEF DESCRIPTION OF THE DRAWINGS

The above, as well as other objects, features, and advantages of the present invention will be understood from the detailed description of the preferred embodiments of the present invention with reference to the accompanying drawings, in which:

FIG. 2 is schematic drawing illustrating a first embodiment of the invention wherein a flue gas treatment system having a gas phase reaction scheme is used with plasma devices distributed radially into the ductwork incorporating the features of the invention;

FIG. 3 is a cross section of the ductwork of FIG. 2 taken along line 3-3 and showing the distribution of the plasma devices in the ductwork;

DETAILED DESCRIPTION OF THE PREFERRED EMBODIMENTS

Figure 1:
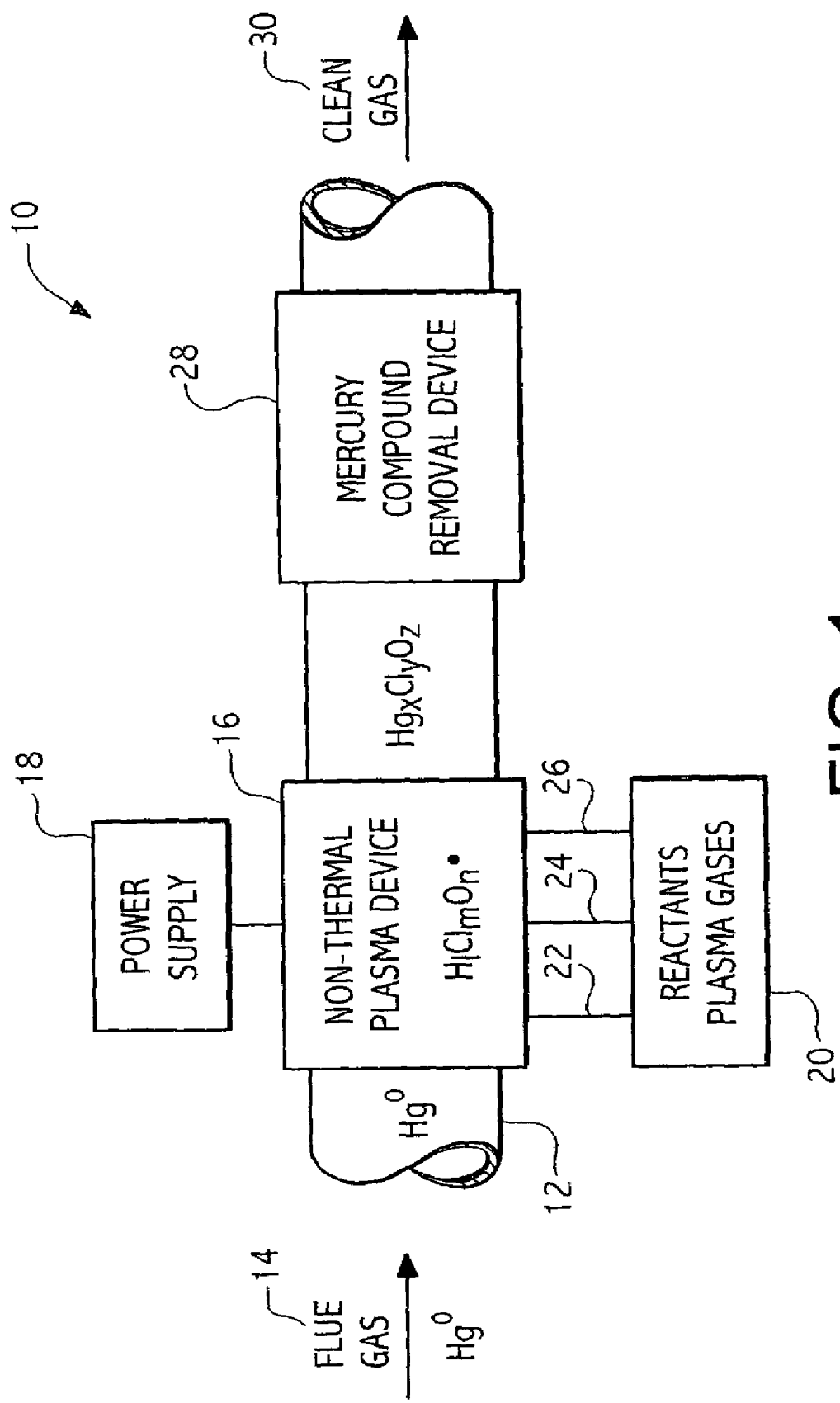
FIG. 1 is a schematic drawing showing a portion of a flue gas treatment system incorporating the features of the invention.
Figure 4:
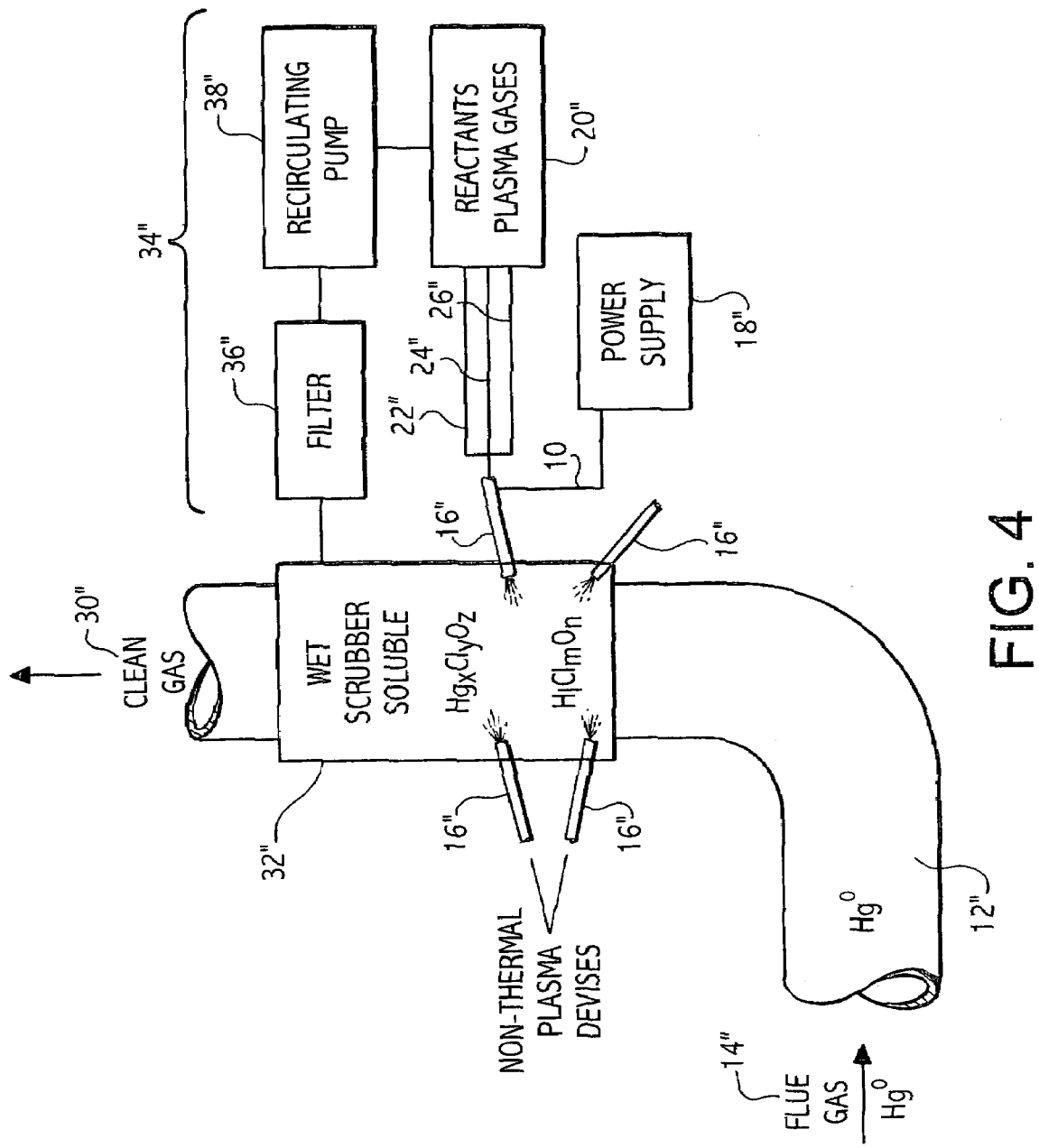
FIG. 4 is a schematic drawing illustrating a second embodiment of the invention showing a portion of a flue gas treatment system having a wet scrubber.
Figure 5:
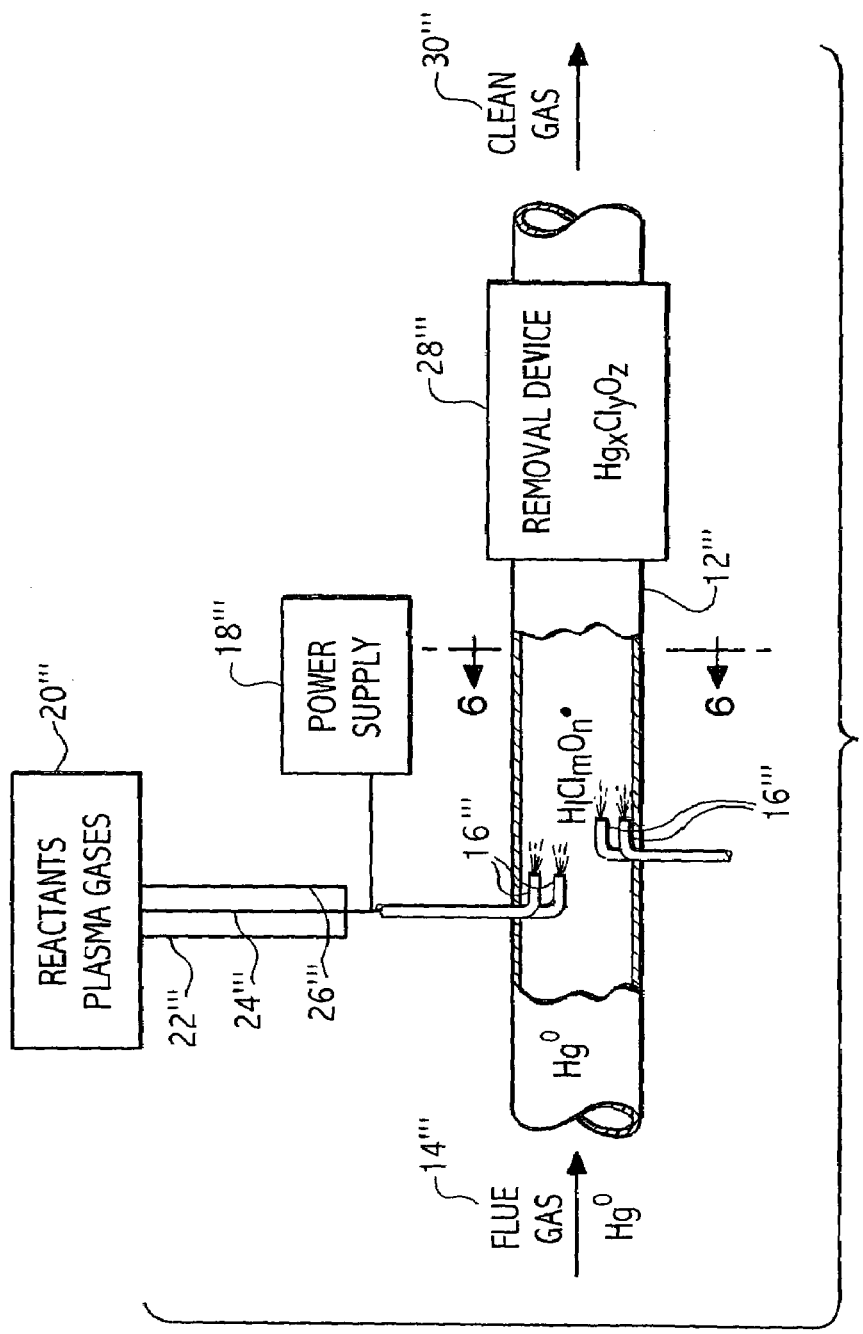
FIG. 5 is a schematic drawing illustrating a third embodiment of the invention showing a gas phase reaction scheme with plasma devices incorporated axially into the ductwork.

Referring now to the drawings, and particularly FIG. 1, there is shown at 10 a plasma based trace metal removal system. FIG. 1 shows the general features of the removal system 10, whereas specific embodiments of the removal system 10 are illustrated in FIGS. 2, 4, and 5. The removal system 10 includes a duct or conduit 12, into which a flue gas 14 containing elemental mercury flows from a source of flue gas. A non-thermal plasma device 16 is disposed in the duct 12. The plasma device 16 is powered by a power supply 18.

A source of plasma gases 20 is fluidly connected to the plasma device 16 by supply lines 22, 24, 26. The source of plasma gases 20 includes reactive gases of the general formula $H_iCl_jO_k$, which are delivered in vaporized or atomized forms through the supply lines 22, 24, 26. Depending upon the particular application, the source of plasma gases 20 may have a gas mixture which includes air, oxygen, nitrogen, argon, helium, water, hydrogen peroxide, and other gases, for example.

A mercury compound removal device 28 is disposed in the duct 12 downstream of the plasma device 16. Downstream of the removal device 28, a clean gas 30 is discharged from the duct 12 of the removal system 10. It is understood that what is described as the clean gas 30 may contain contaminants of varying concentrations depending upon the specific design parameters and operating conditions of the removal system 10.

Referring now to FIG. 2, there is shown an embodiment of the invention. In the embodiment of FIG. 2, four plasma devices 16' are shown distributed radially in the duct 12'. Although four plasma devices 16' are illustrated, it is understood that varying numbers of plasma devices 16' may be used depending upon the specific removal system 10 configuration, flow patterns, etc. FIG. 3 shows the radial distribution of the plasma devices 16'. Although only one of the plasma devices 16' is shown connected to the power supply 18' and the plasma gas source 20', each of the plasma devices 16' is similarly connected.

In FIG. 4, another embodiment is illustrated where a wet scrubber 32" is used as the removal device 28. In the embodiment shown, a recycle loop 34" is included. The recycle loop 34" includes a filter 36" and a recirculating pump 38". The filter 36" is in fluid communication with the wet scrubber 32" and the pump 38". The pump 38" is in fluid communication with the plasma gas source 20". Again, although only one of the plasma devices 16" is shown connected to the power supply 18" and the plasma gas source 20", each of the plasma devices 16" is similarly connected. It is understood that a removal device 28 other than a wet scrubber 32" could be used such as a particulate species type or another soluble species type, for example, could be used without departing from the scope and spirit of the invention. It is also understood that the system could be operated without the recycle loop 34"

Figure 6:
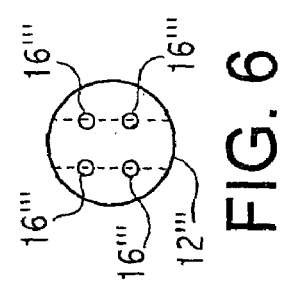
FIG. 6 is a cross section of the ductwork of FIG. 5 taken along line 6-6 and showing the distribution of the plasma devices in the ductwork.

Yet another embodiment is illustrated in FIG. 5. The plasma devices 16'" shown are positioned to discharge plasma gases axially into the duct 12'". FIG. 6 illustrates the distribution of the plasma devices 16'" within the duct 12'". Once again, although only one of the plasma devices 16'" is shown connected to the power supply 18'" and the plasma gas source 20'", each of the plasma devices 16'" is similarly connected.

Figure 7:
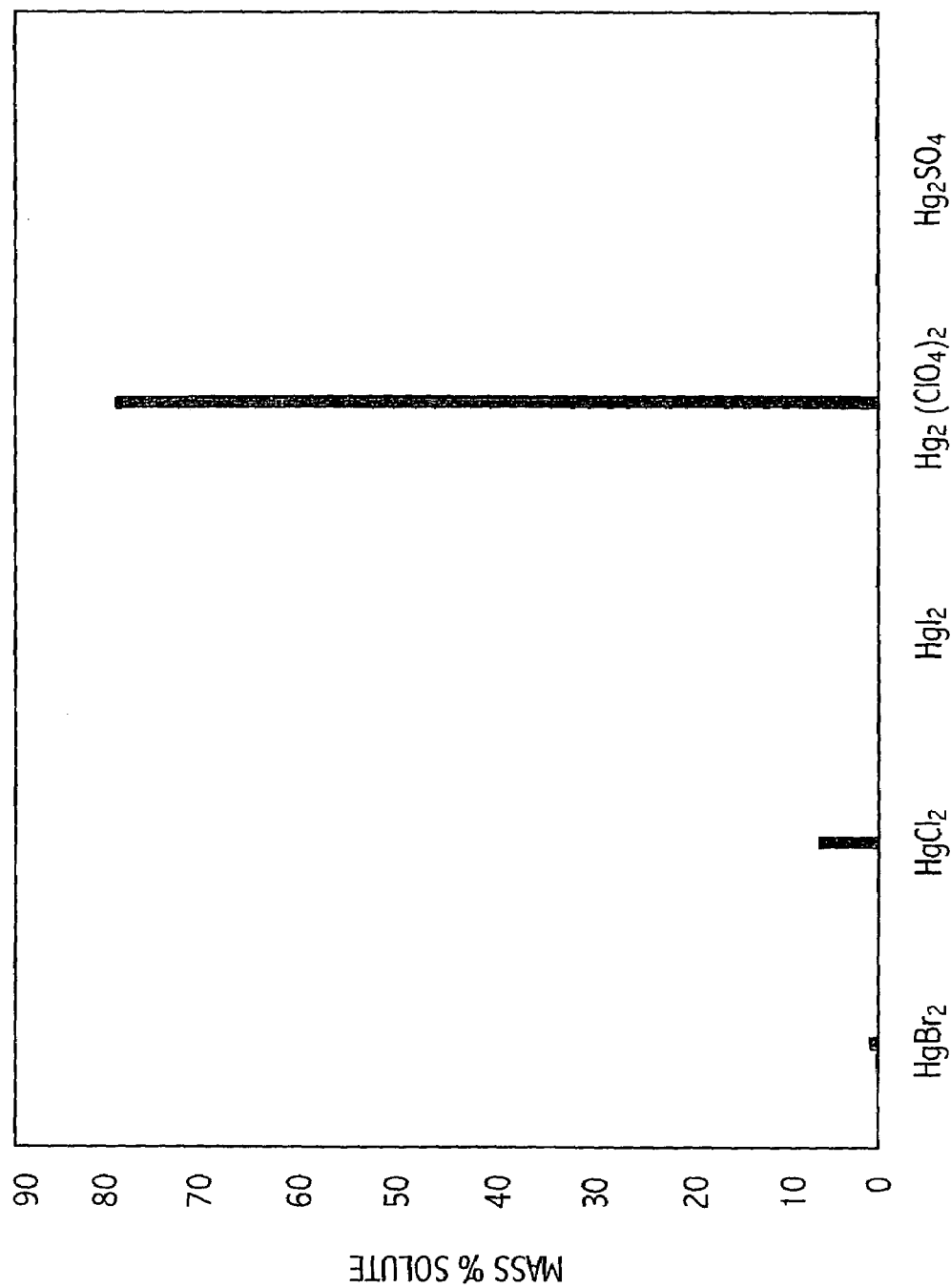
FIG. 7 is a graphical presentation of the water solubility of various mercury compounds.

FIG. 7 is a plot of the water solubility of mercury bromide or $HgBr_2$, mercury chloride or $HgCl_2$, mercury iodide or $HgI_2$, mercury perchlorate or $Hg_2(ClO_4)_2$, and mercury sulfate or $Hg_2SO_4$. Due to the higher solubility, the target compounds for soluble species of mercury for removal are the mercury chloride, and in particular, mercury perchlorate.

Figure 8:
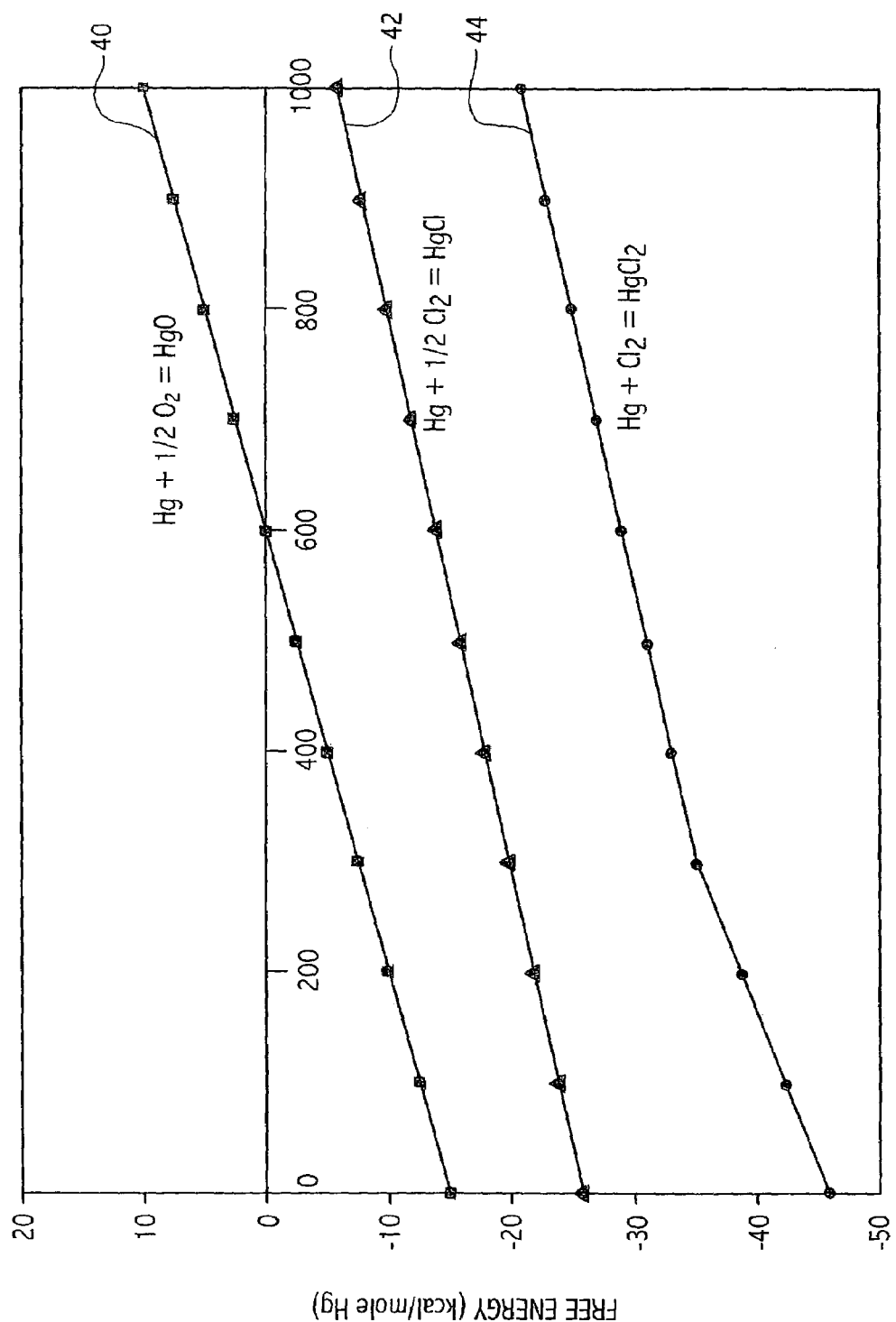
FIG. 8 is a plot of the free energy of formation for selected mercury compounds.

FIG. 8 illustrates the free energy of formation of simple mercury oxide (HgO) and chlorides (HgCl and $HgCl_2$) as a function of temperature from 0 to 1000° C. The free energy of formation of mercury (II) oxide 40 is greater than the free energy of formation for the mercury (I) chloride 42 and mercury (II) chloride 44. This indicates that mercury (I) chloride 42 and mercury (II) chloride 44 formation is thermodynamically favored over the mercury (II) oxide 40 formation. In addition, FIG. 8 also demonstrates that conversion of elemental mercury to an ionic form is favored at lower temperatures. Typical flue gas temperatures exiting a burner may approach or exceed 1000° C. Flue gas temperatures are typically reduced in a quench tower, resulting in gas temperatures on the order of 100° C. which aids in mercury ion formation.

The operation of the embodiments of the invention will now be described. In FIG. 1, the flue gas 14 containing elemental mercury flows through the duct 12. The reactive gases supplied by the source 20 are delivered in vaporized or atomized form to the plasma device 16 through the supply lines 22, 24, 26. Activated species, of the general form $H_iCl_mO_{n'}$, are created within the plasma device 16 by gas phase introduction from the source 20. The plasma device 16 inserted into the duct 12 discharges the activated species into the flue gas 14. The activated species ($H_lCl_mO_n$.), rapidly reacts with the elemental mercury contained in the flue gas 14 to form compounds of the general form $Hg_xCl_yO_z$. The mercury compound is captured in the removal device 28 which employs a capture mechanism such as a particulate species or a soluble species capture mechanism. The removal device 28 may be an electrostatic precipitator or a wet scrubber, for example. The clean flue gas 30 exits the removal device 28.

For a small-scale removal system, the power supply 18 is nominally sized on the order of 100 kW. The power supply 18 may be larger or smaller depending upon factors such as the duct 12 size, the flue gas 14 flow rates, and flue gas 14 composition, for example.

The embodiment illustrated in FIG. 2 shows the plasma devices 16' inserted radially into the duct 12'. The reactive gases supplied by the source 20' flow through each of the supply lines 22', 24', 26' to the plasma devices 16' at a nominal flow rate of five standard cubic feet per hour for each of the plasma devices 16' using eight plasma devices 16'. The number of plasma devices 16' and the system-specific flow rates are dependent upon specific system configuration and flow patterns and are determined by a fluid dynamics model. The plasma devices 16' may be angled relative to the duct 12'. The angle is varied for optimal gas mixing, but contains at least a component vector in the same direction as the flue gas 14' flow. In this manner, optimal mixing is achieved, and the plasma gas flow must not be overly increased to overcome the momentum of the flue gas 14'.

As in FIG. 1, the input power to each of the plasma devices 16' is supplied by connection to the power supply 18'. Nominally, 35-70 watts is supplied to each of the plasma devices 16'. Again, the power supply 18' may be larger or smaller depending upon factors such as the duct 12 size, the flue gas 14 flow rates, and the flue gas 14 composition, for example.

FIG. 4 shows another embodiment of the invention. The flue gas 14" containing elemental mercury flows through the duct 12" and into a wet scrubber 32". The plasma devices 16" are inserted into the scrubber 32". The number of plasma devices 16" is dependent upon specific system configuration and flow patterns and is determined by a fluid dynamics model. The required configuration of the plasma devices 16" resulting in the flow pattern for optimal mixing is also determined by the fluid dynamics model.

The input power from the power supply 18" to each of the plasma devices 16" is nominally 35-70 watts. The reactive gases flow through each of the supply lines 22", 24", 26" to each of the plasma devices 16" at a nominal flow rate of five standard cubic feet per hour. System-specific flow rates are determined using the previously mentioned fluid dynamics models as well. The activated species ($H_lCl_mO_n$.), reacts with the elemental mercury contained in the flue gas 14" within the wet scrubber 32". This results in formation of a solution containing soluble mercury compounds of the general form $Hg_xCl_yO_z$ that remains in the wet scrubber 32". The clean flue gas 30" exits wet scrubber 32".

The wet scrubber 32" solution may be recycled through the filter 36" and the recirculating pump 38" to regenerate the activated species ($H_lCl_mO_n$.). This may introduce source chemicals used as scrubber solutions such as NaOCl or other solutions, for example, into the plasma devices 16".

The embodiment illustrated in FIG. 5 shows the plasma devices 16''' inserted axially into the duct 12'''. As before, the input power supplied by the power supply 18''' to each of the plasma devices 16''' is nominally 35-70 watts. The reactive gases flow through each of the supply lines 22''', 24''', 26''' to each of the plasma devices 16''' at a nominal flow rate of five standard cubic feet per hour. The number of plasma devices 16''' and system-specific flow rates are determined in a fluid dynamics model. The plasma devices 16''' are positioned in the flow stream of the flue gas 14''' within the duct 12'''. The plasma devices 16''' may be slightly angled for optimal mixing patterns, as determined by the fluid dynamics model.

The embodiments shown in FIGS. 2 and 5 may be used to generate plasma gases of the composition as before, $H_lCl_mO_n$. In these embodiments, the mercury compounds, $Hg_xCl_yO_z$ are generated by rapid reaction with the plasma gas. Capture is shown in both figures in a generalized manner in the removal device 28. The removal device 28 may be a wet scrubber, as in wet scrubber 32" of FIG. 4, or an alternative particle removal device such as an electrostatic precipitator, for example.

Alternatively, the reactive species generated in the plasma devices may be a metastable oxygen species, O. In this embodiment, a mercury (II) oxide is formed, which subsequently may be captured as a particle in a device such as an electrostatic precipitator, for example. Since the present invention does not contain an upstream particle filter, it is envisioned that particle growth and agglomeration may be promoted.

The removal system 10 may be easily incorporated into existing flue gas systems, is economical, is easily maintained, uses common gases and chemicals for reactants, and may result in a waste stream which is not required to be treated as a hazardous waste. Additionally, the device may be used as a secondary destruction method for trace components in flue gases. For example, when employed in a chemical demilitarization incineration facility, the system may be used as a final destruction means for chemical agents such as sulfur mustard, VX, GB and others. The removal system 10 may also be used to destroy problematic and highly toxic compounds such as polychlorinated dibenzo-para-dioxins and dibenzo furans (PCDDs/PCDFs) and polycyclic aromatic hydrocarbons (PAH). In a more general sense, the device may be used to destroy products of incomplete combustion (PICs) and products formed from reformation and other reactions.

Several advantages are experienced by using the embodiments of the removal systems and methods described. A removal system is produced which effectively captures and removes mercury and other volatile and semi-volatile metals, and other trace species from flue gas streams. The removal system can also effectively convert elemental mercury to ionic mercury to aid in capture of the mercury. Another advantage is that of producing a removal system which results in capture of gas phase mercury by conversion into mercury compounds that are highly water-soluble. Yet another advantage is to produce a removal system which utilizes highly reactive species in either gas or liquid phase chemistry to ensure a kinetically favored process.

Advantages over other types of removal systems include not having to rely upon a barrier discharge design with the result that an upstream particulate filter may not be required and the mercury capture technique may utilize an agglomeration and growth method to remove flue gas particles. Additionally, since the method does not rely upon an adsorptive capture mechanism, problems associated with the competition for active sites and finite adsorption lifetime are avoided.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A plasma based removal apparatus for the removal of contaminants from a gas stream consisting essentially of:
   a non-thermal plasma generation device adapted for installation in a conduit, said plasma device being a first treatment device located in the gas stream, the gas stream containing at least one contaminant;
   a source of electrical power supplying electrical power to said plasma device;
   a source of plasma gas in fluid communication with said plasma device to create an activated species within said plasma device and discharge the activated species into the gas stream, whereby the activated species reacts with the at least one contaminant to form at least one reactant compound; and
   a removal device in direct communication with said plasma device for removing the at least one reactant compound from the gas stream.

2. The removal apparatus according to claim 1, wherein the at least one contaminant includes at least one of a volatile metal and a semi-volatile metal.

3. The removal apparatus according to claim 1, wherein the at least one contaminant comprises mercury.

4. The removal apparatus according to claim 1, wherein said removal device is a particulate species type.

5. The removal apparatus according to claim 1, wherein said removal device is a soluble species type.

6. The removal apparatus according to claim 1, wherein said removal device is an electrostatic precipitator.

7. The removal apparatus according to claim 1, wherein said removal device is a wet scrubber.

8. The removal apparatus according to claim 1, wherein the at least one reactant compound includes at least one of a metal chloride and an oxy-chloride.

* * * * *